United States Patent
Vos et al.

(10) Patent No.: US 11,570,829 B2
(45) Date of Patent: Jan. 31, 2023

(54) METHOD AND APPARATUS FOR SUPPORTING DEVICE TO DEVICE COMMUNICATION FOR WIRELESS DEVICES

(71) Applicant: SIERRA WIRELESS, INC., Richmond (CA)

(72) Inventors: Gustav Gerald Vos, Surrey (CA); Vishnu Rajendran Chandrika, Vancouver (CA); Gautham Prasad, Vancouver (CA); Lutz Hans-Joachim Lampe, Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 113 days.

(21) Appl. No.: 17/116,312

(22) Filed: Dec. 9, 2020

(65) Prior Publication Data

US 2022/0183091 A1    Jun. 9, 2022

(51) Int. Cl.
*H04W 72/04* (2009.01)
*H04L 1/18* (2006.01)
*H04W 72/12* (2009.01)
*H04W 76/14* (2018.01)

(52) U.S. Cl.
CPC .................. *H04W 76/14* (2018.02)

(58) Field of Classification Search
CPC . H04W 76/14; H04W 72/0406; H04W 92/18; H04W 72/02; H04W 72/042; H04W 72/0446; H04W 72/087; H04B 7/0695; H04B 7/088; H04L 1/1812
USPC ........................................................ 370/329
See application file for complete search history.

(56) References Cited

U.S. PATENT DOCUMENTS

| | | | |
|---|---|---|---|
| 9,615,340 B2* | 4/2017 | Abedini | H04W 4/70 |
| 10,212,676 B2* | 2/2019 | Lee | H04W 72/04 |
| 10,764,867 B2* | 9/2020 | Chae | H04W 72/0406 |
| 2015/0215903 A1* | 7/2015 | Zhao | H04W 72/02 370/329 |
| 2015/0271841 A1* | 9/2015 | Yamada | H04W 72/02 370/329 |
| 2019/0372647 A1* | 12/2019 | Su | H04W 16/28 |
| 2020/0359366 A1* | 11/2020 | Kim | H04L 1/1812 |
| 2020/0396716 A1* | 12/2020 | Li | H04W 72/042 |
| 2021/0050931 A1* | 2/2021 | Hahn | H04L 5/0007 |

(Continued)

FOREIGN PATENT DOCUMENTS

WO    2021108897 A1    6/2021

OTHER PUBLICATIONS

International Search Report and Written Opinion of International Application No. PCT/CA2020/051632; dated Jan. 11, 2021; 10 pages.

(Continued)

*Primary Examiner* — Edan Orgad
*Assistant Examiner* — Vanneilian Lalchinthang
(74) *Attorney, Agent, or Firm* — Perkins Coie LLP (57) ABSTRACT

There is provided a method and user equipment (UE) for supporting device to device (D2D) communication, for example side link communication, of wireless devices. At least one of the source UE or the destination UE is out of synchronization. Side link (SL) communication information (e.g. SL sync signal, SL timing request message, SL-data, special sync signal) may be blindly and repeatedly transmitted until the source UE receives a response from the destination UE.

28 Claims, 9 Drawing Sheets

(56) References Cited

U.S. PATENT DOCUMENTS

2021/0050950 A1* 2/2021 Zhou .................... H04L 1/1861
2021/0099994 A1* 4/2021 Park ..................... H04L 1/1861
2021/0212106 A1* 7/2021 Farag ................. H04W 72/0406
2022/0094481 A1* 3/2022 Hong ................. H04W 72/0406

OTHER PUBLICATIONS

International Search Report and Written Opinion of International Application No. PCT/CA2021/051759; dated Mar. 7, 2022; 8 pages.
LTE; ETSI TS 136.211 v15.7.0 (Oct. 2019), Section 9, pp. 188-198.
LTE; ETSI TS 136.211 V16.3.0 (Nov. 2020), Section 9, pp. 135-205.
LTE; ETSI TS 136.212 v15.7.0 (Oct. 2019), Section 5.4, pp. 234-237.
LTE; ETSI TS 136.212 v16.3.0 (Nov. 2020), Section 5.4, pp. 240-243.
LTE; ETSI TS 136.213 V15.7.0 (Oct. 2019), Sections 12 and 14, pp. 471 and 476-503.
LTE; ETSI TS 136.213 V16.3.0 (Nov. 2020), Sections 12 and 14, pp. 490-491 and 496-524.

* cited by examiner

METHOD AND APPARATUS FOR SUPPORTING DEVICE TO DEVICE COMMUNICATION FOR WIRELESS DEVICES

FIELD OF THE INVENTION

The present invention pertains in general to wireless communications, and in particular to methods and apparatuses for supporting device to device communication for wireless devices.

BACKGROUND

A legacy cellular user equipment (UE) can communicate with another UE through a base station (BS) irrespective of the proximity (e.g. distance) between them. Such communication typically involves the use of licensed resources which incurs additional cost and consumes extra time and energy in order to establish a connection over the cellular network. On the other hand, device-to-device communication, for example side link (SL) communication, can enable UEs to directly communicate with each other. SL communication can be performed with or without assistance of a BS, which can potentially improve latency and battery life of the UE. Further, use of the unlicensed band for SL (SL-U) can provide some benefits without using expensive licensed spectrum thereby reducing the cost of transmission.

SL can be regarded as a secondary radio access technology and can coexist with the primary cellular communication on the UE without additional radio hardware. To this end, the existing SL protocol is designed to operate only when both the UE's transmitter and receiver are relatively free from cellular link responsibilities. For example, this can occur when the UE is in cellular discontinuous reception (DRX) mode. During cellular DRX mode, a UE can listen for a SL grant or SL message periodically, based on its SL-DRX cycle on the dedicated time slots. This is referred to as a SL paging occasion (SL-PO). To avoid conflicts, the locations of the SL-POs can be specified in true time, based on the unique ID of the UE. Once a SL communication link is established, SL message exchange can follow a synchronous hybrid automatic repeat request (HARQ) process until completion of the message exchange. Thus, for this communication to occur, a UE that wishes to communicate with another UE via SL must be synchronized with and know the location of the destination (DST) UE's SL-PO.

Currently, there are some general requirements for SL. The SL protocol should be designed to operate on half-duplex frequency division duplex (HD-FDD) devices and should use the existing single radio. Further, the SL protocol should also be designed to meet reasonable latency and battery life targets with respect to the UEs and provide a level of flexibility for latency-power trade-off.

Current SL protocols typically only work where the source (SRC) UE and destination (DST) UE, which communicate with each other, are synchronized to the same cellular synchronization signals provided by a base station. Moreover, existing SL protocols require the SRC UE to acquire the location of the DST UE's SL-PO from the SL server. This can be accomplished for example, by obtaining the DST UE's ID and the SL-DRX period. However, existing SL protocols cannot always be used since the requirements, for example those as noted above, cannot be met at least in some circumstances. For example, when at least one of the SRC UE and DST UE is out of cellular coverage (OoCC) or connected to a different unsynchronized base station, the two UEs would not be synchronized and thus would be unable to communicate using SL. In another example, when the SRC UE is out of cellular coverage, the SRC UE does not have access to the SL server and therefore, would not be able to determine the location of the DST UE's SL-PO.

Therefore, there is a need for a method and apparatus for supporting device to device communication between wireless devices, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for supporting device to device communication between wireless devices.

In accordance with embodiments of the present invention, there is provided a method that includes repeatedly transmitting, by a source user equipment (SRC UE), SL communication information and receiving, by the SRC UE from a destination UE (DST UE), a response to the SL communication information. The SRC UE continues repeated transmission of SL communication information until the response is received.

According to some embodiments, the SL communication information includes a SL sync signal. According to some embodiments, the SL communication information includes SL-data. According to some embodiments, the SL-data is one or more of: a SL timing request message, a SL sync request message, configured using orthogonal frequency division multiplexing and configured using quadrature phase shift keying.

According to some embodiments, the SRC UE is synchronized with the DST UE and the SL communication information includes SL-data and excludes a SL sync signal. According to some embodiments, the SRC UE is unsynchronized with the DST UE, wherein the SL communication information includes the SL sync signal and the SL-data, wherein the SL sync signal is transmitted prior to the SL-data. According to some embodiments, the SL communication information is a single synchronization signal, the single synchronization signal configured at least in part as a SL sync signal and a SL timing request. According to some embodiments, the SL communication information comprises a SL sync signal and SL data, wherein the SL sync signal is transmitted prior to the SL data.

According to some embodiments, the SRC UE determines timing of transmission of the SL communication information by decoding the SL communication information. According to some embodiments, the DST UE is configured to monitor for the SL communication information within a time window.

According to some embodiments, transmission of the SL communication information is repeated multiple times based on a maximum number of attempts to transmit and a time between the attempts. According to some embodiments, the response includes one or more of: precise timing, macro timing, a synchronization method, an identifier (ID) of the DST UE, SL-discontinuous reception (SL-DRX) information and receiver (Rx) beacon information. According to some embodiments, receiving by the DST UE is performed during a receiver (Rx) sync time window, wherein the Rx sync time window is configured to occur periodically or after a fixed duration or continuously for a DST UE as desired by the application/use. According to some embodiments, transmission of the SL communication information is performed in cooperation with a receiver (Rx) beacon.

According to some embodiments, a server provides the DST UE with one or more synchronization errors including: Coarse Sync Timing Error, DST UE Sync Error, SRC UE Sync Error, and Time of Flight. According to some embodiments, a length of time that the DST UE monitors for the SL communication information is equal to or greater than a sum of the synchronization errors. According to some embodiments, the Coarse Sync Timing Error is determined based on a synchronization method.

In accordance with embodiments of the present invention, there is provided a user equipment including a processor and machine readable memory, which stores machine executable instructions. The machine executable instructions which when executed by the processor, configures the UE to repeatedly transmit SL communication information and receive, from a destination UE (DST UE), a response to the SL communication information. The UE is configured to continue repeated transmission of SL communication information until the response is received.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Definitions

It will be readily understood that communication between wireless devices can be enabled in multiple ways, and it can be defined as device to device (D2D) communications. In some embodiments of the present disclosure D2D communication has been defined as sidelink (SL) communications as an example. However, it will be readily understood by a worker skilled in the art how to apply any embodiments which may be defined as SL communications to a more general version of D2D communications. It will be further understood that while some of the discussion below relates to D2D communications, for example SL communications, using unlicensed bands, it would be readily understood how to apply such embodiments when using licensed bands as well.

In the present disclosure, the term source (SRC) device is used to define a device, for example a user equipment (UE), which initiates D2D communication with a destination (DST) device, for example a UE. In addition, the term DST device is used to define a device, for example a UE, which receives a request for D2D communication from a SRC device, for example a UE. It will be readily understood, that both the SRC device and the DST device are configured in order to perform both transmission and reception of information that can enable at least D2D communications.

In the present disclosure, the term "Rx Sync window" is used to define a time range that a destination device (e.g. user equipment (UE)) monitors for a side link (SL) synchronization signal.

In the present disclosure, the terms "precise sync" and "precise synchronization" are interchangeably used to define synchronization between devices (e.g. UEs) where a synchronization error is within the cyclic prefix (CP), for example 5 μs.

In the present disclosure, the terms "coarse sync" and "coarse synchronization" are interchangeably used to define synchronization between devices (e.g. UE) where synchronization error is within the maximum practical Rx sync window.

Unless defined otherwise, all technical and scientific terms used herein have the same meaning as commonly understood by one of ordinary skill in the art to which this invention belongs.

The present disclosure provides methods and apparatuses for supporting device to device (D2D) communication, for example side link (SL) communication, between wireless devices. According to some of the embodiments, the present disclosure provides methods and apparatuses for (D2D) communication on wireless bands when a source UE (SRC UE) and a destination UE (DST UE) are unsynchronized.

It will be readily understood that communication between wireless devices can be enabled in multiple ways, and it can be defined as device to device (D2D) communications. In some embodiments of the present disclosure D2D communication has been defined as side link (SL) communications as an example. However, it will be readily understood by a worker skilled in the art how to apply any embodiments which may be defined as SL communications to a more general version of D2D communications.

Existing protocols for SL work only where the SRC UE and the DST UE are synchronized to the same cellular synchronization signals and the SRC UE knows the location of the DST UE's SL paging occasion (SL-PO). However, the existing SL protocols cannot be used in some circumstances. For example existing SL protocols cannot be used when at least one of the SRC UE and the DST UE is out of cellular coverage or when the UEs are connected to different unsynchronized base stations (i.e. synchronization problem) or when the SRC UE is not able to access the SL server and therefore does not know the location of the DST UE's SL-PO (i.e. unknown SL-PO location problem). As such, efforts have been made to overcome the limitations of the existing SL protocols, in terms of synchronization and unknown SL-PO location.

Synchronization Problem

Attempts to overcome the synchronization issue residing in the existing SL protocols can include the use of a long SL Rx synchronization window and a variety of different coarse synchronization methods.

Long SL Rx Sync Window

Figure 1:
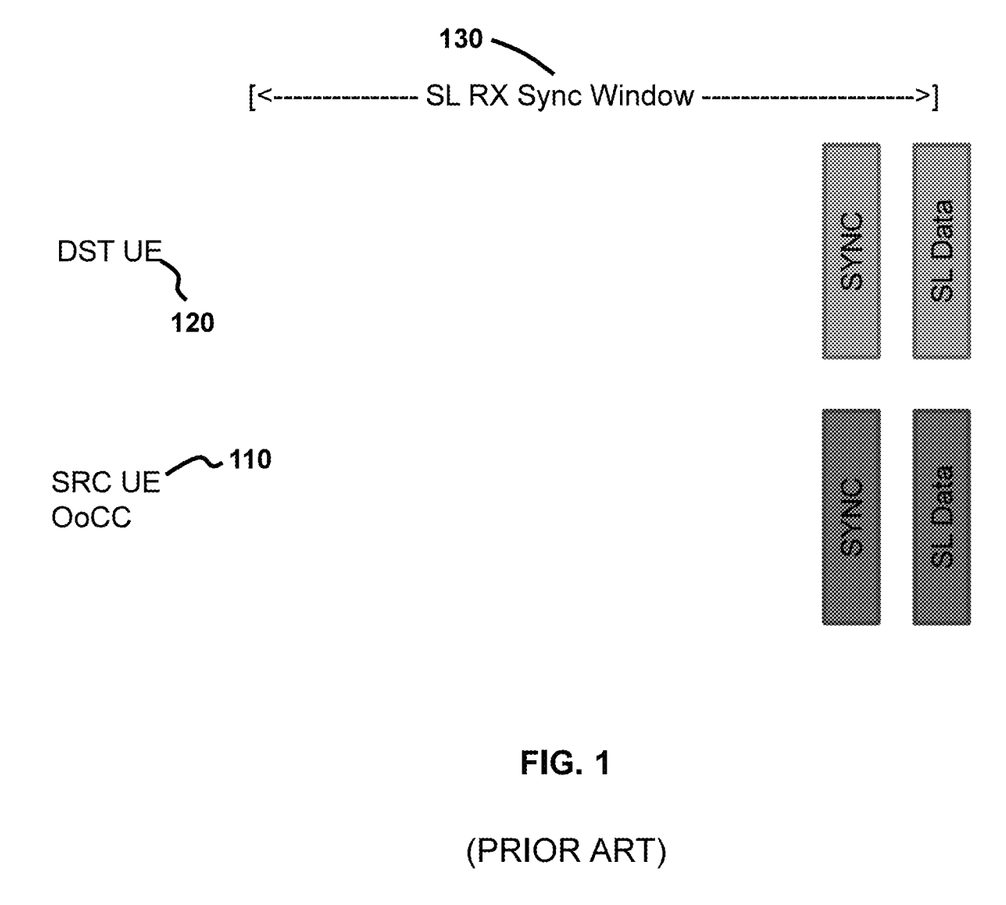
FIG. 1 illustrates an example of resolving a synchronization issue residing in SL communication by transmitting a SYNC signal before SL data according to the prior art.

FIG. 1 illustrates an example of resolving a synchronization issue residing in SL communication by transmitting a SYNC signal before SL data. Long-Term Evolution (LTE) device-to-device (D2D) communication uses a technique where the SRC UE 110 transmits an SL synchronization (SYNC) signal before sending SL-data. Upon receiving the SL Sync signal, the DST UE 120 will synchronize to the SRC UE 110 using the received SL Sync signal before trying to decode the SL-data. The DST UE 120 will listen for the SL Sync signal within a certain time range, hereinafter referred to as the SL Rx Sync window. An example of the SL Rx Sync window (e.g. SL Rx Sync window 130) is also illustrated in FIG. 1.

A problem with this method is that the SRC UE 110 and DST UE 120 need to be coarse synchronized in advance. For example, coarse synchronization may define synchronization between devices (e.g. between UEs) where a synchronization error is within a maximum practical Rx sync window. Otherwise, for example, the SL Rx Sync window 130 would be impractically long. The length of the SL Rx Sync window (e.g. SL Rx Sync window 130) needs to be long enough to account for timing errors between the SRC UE 110 and DST UE 120. The timing errors may include, but not limited to, one or more of the following:

Coarse sync timing error is an error due to the coarse timing method (which is illustrated elsewhere in the present disclosure). Each coarse timing method can have different amounts of error associated therewith.

DST UE sync error is a timing error in the DST UE (e.g. DST UE 120). This error usually occurs due to crystal reference oscillator (XTAL) accuracy, for example the accuracy of a crystal oscillator. Generally, the DST UE sync error is equal to approximately (DST XTAL accuracy)×(Time since last Coarse Sync).

SRC UE sync error which is a timing error in the SRC UE (e.g. SRC UE 110). This error usually occurs due to XTAL accuracy. Generally, the SRC UE sync error is equal to approximately (SRC XTAL accuracy)×(Time since last Coarse Sync).

Time of flight which is time required for transmission from the SRC UE (e.g. SRC UE 110) to the DST UE (e.g. DST UE 120). Generally, the time of flight is equal to approximately (distance between SRC UE and DST UE)/(speed of light).

Therefore, based on the above, the length of the SL Rx SYNC window can be defined as being substantially equal to or greater than the sum of Coarse Sync Timing Error and DST UE Sync Error and SRC UE Sync Error and Time of Flight.

In order to substantially minimize power consumption, the SL Rx Sync window should be minimized. As such, in order to minimize power consumption, the value of coarse sync timing error, DST UE sync error, SRC UE sync error and time of flight should be known. However, some of these values, such as DST UE sync error, are unknown to the DST UE. As such, the method of minimizing the SL Rx Sync window (by the DST UE) is unknown and therefore means for, at least in part, providing power optimization (e.g. minimizing power consumption) is also unknown.

Coarse Sync Methods

Other known methods for resolving the synchronization issue residing in SL would be coarse synchronization methods. There are several known coarse synchronization methods that can be used with SL which can include using LTE synchronization signals including primary synchronization signals (PSS)/secondary synchronization signals (SSS)/master information block (MIB), global navigation satellite system (GNSS) based synchronization and side link (SL) beacons. However, each of these coarse synchronization methods has at least some limitations.

LTE PSS/SSS/MIB

The LTE cellular synchronization signals, for example PSS/SSS/MIB signals, can be used to provide synchronization for SL. The accuracy of these synchronization signals depends on whether the SRC UE and the DST UE are synchronized to the same cell (e.g. same base station). If the SRC UE and DST UE are synchronized to the same cell, there is no sync timing error and therefore, precise timing can be provided. If the SRC UE and the DST UE are synchronized to different base stations, the level of synchronization between the two UEs would depend on cell synchronization. LTE does not require cells to be synchronized but, they can be synchronized. It may be noted that primary synchronization signals (PSS), secondary synchronization signals (SSS) and the master information block (MIB) can be decoded far beyond where user plane activity can be supported (e.g. 160 dB maximum coupling loss (MCL)). As such, it is possible to be in PSS/SSS/MIB coverage but out of cellular coverage.

There are a number of problems when using the synchronization signals illustrated above (e.g. PSS, SSS, MIB). For example, when the SRC UE and the DST UE are synchronized to different cells (e.g. different base stations), the two UEs do not know the synchronization error. Also, this method only works within PSS/SSS/MIB coverage and can take several seconds to synchronize in low signal-to-noise Ratio (SNR) (e.g. 160 dB MCL) which can negatively impact battery life of the UEs.

GNSS-Based Synchronization

Global Navigation Satellite System (GNSS) can be also used to provide synchronization for SL. GNSS-based synchronization can provide up to 40 ns of synchronization. However, GNSS-based synchronization can take several seconds to get time sync from GNSS, therefore this method of synchronization is not a power efficient method. Furthermore, this method only works outside and can be an expensive method as it requires additional hardware, for example for accessing the GNSS.

SL Beacons

In LTE device to device (D2D) communications, some UEs are assigned to act like SL beacons by periodically transmitting side link primary synchronization signals (SPSS) and side link secondary synchronization signal (SSSS) followed by a broadcast message which includes the system frame number (and in some configurations a hyper frame number, however this is currently not a feature of LTE D2D communications). This method of assigning a UE to act as a SL beacon can be also used for SL. Whether or when a UE becomes a SL beacon can be pre-configured or self-elected or directed by the SL server. For example, the UE may self-elect to become a SL beacon when it does not receive synchronization signals from any other sources. This method can provide good accuracy unless the SRC UE is not synchronized to the same source as the UE acting as a SL beacon UE. If the SRC UE is not synchronized to the same source as the UE acting as the SL beacon, the accuracy can depend on how closely the SRC UE and UE acting as a SL beacon are synchronized.

Assigning some UEs to act like SL beacons for SL can have some disadvantages. One of the disadvantages is energy consumption. Significant battery power is required for UEs to become SL beacons. Further, for the synchronization signals to be effective, these synchronization signals should be transmitted at known times; however, as SL implementation is based on the constraints of using a shared single HD-FDD radio, it may not be possible to transmit the synchronization signals at precise times.

Accordingly, as illustrated above, each of the above coarse synchronization methods have at least some issues or limitations therewith for providing synchronization for SL. Further, each of the above coarse synchronization methods can require the UE to already have information relating to SL-PO location.

Unknown SL-PO Location Problem

As stated above, a limitation of current SL protocols is associated with the unknown SL-PO location. Some methods to overcome the unknown SL-PO location issue for SL are discussed below including limitations therewith.

Based on a first method, in order to overcome the unknown SL-PO location, the SL-PO location can be pre-defined. The UEs (e.g. SRC UE and DST UE) can be pre-configured at the factory with a predefined SL-PO location. This action can be performed by manually pre-configuring the UEs with the possible DST UE IDs and the associated possible extended discontinuous reception (eDRX) values.

However, this pre-configuration method may not always be feasible. For example, when the number of UEs in the group is large, the method may not be scalable as the SRC UE needs to try every possible UE ID in order to find out which DST UE is reachable. Furthermore, this pre-configuration method may not work in conditions where the SL-DRX is dynamic.

Another solution for overcoming the unknown SL-PO location is to configure a UE to act as a SL server. However, there are problems with this method as well. For example, if a UE is configured to act as a SL server, the UE would need to be operating for most of the time and thus, would need a larger battery or potentially a direct power supply (e.g. alternating current (AC) power supply). Further, non-homogeneous or heterogeneous sets of UEs would render such deployment even more complicated. In addition, while the SRC UE can require access to the UE SL server, however, such access is not possible if the SRC UE does not know the location of the SL-PO of the UE SL server.

Another or further solution for overcoming the unknown SL-PO location is to use a mesh protocol. For example, a mesh protocol can be used on top of the SL protocol such that the access to the SL server can be made through substantially any UE which is part of the mesh. However, this method also has a potential problem. For instance, the SRC UE can still require access to at least one UE connected to the mesh. However, such access is not possible if the SRC UE does not know the location of the SL-PO of the SL server.

In order to address at least some of the above problems, there are provided methods and apparatuses for supporting D2D communications, for example side link (SL) communication. In some of the embodiments, the methods and apparatuses can support SL communication where a source (SRC) or destination (DST) UE is unsynchronized.

Timing Request

Figure 2A:
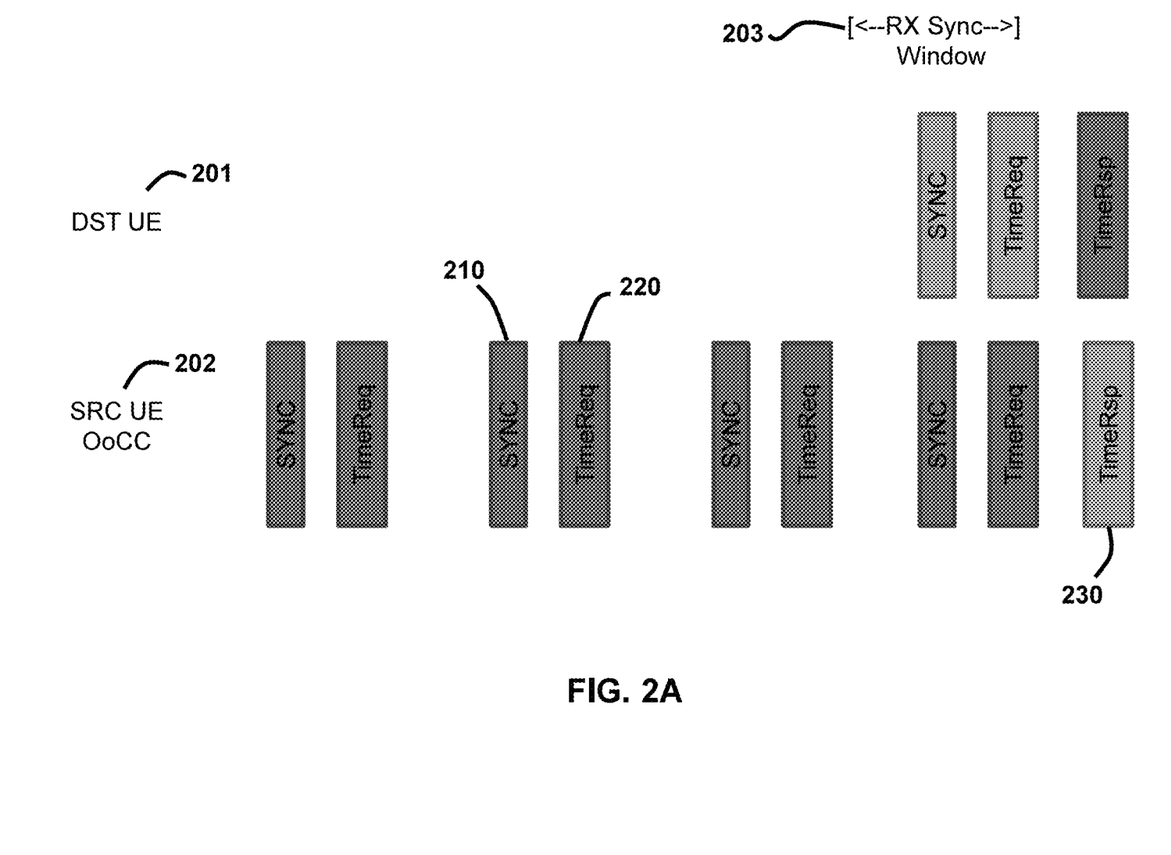
FIG. 2A illustrates a 3-step approach for a timing request solution supporting SL communication, in accordance with embodiments of the present disclosure.
Figure 2B:
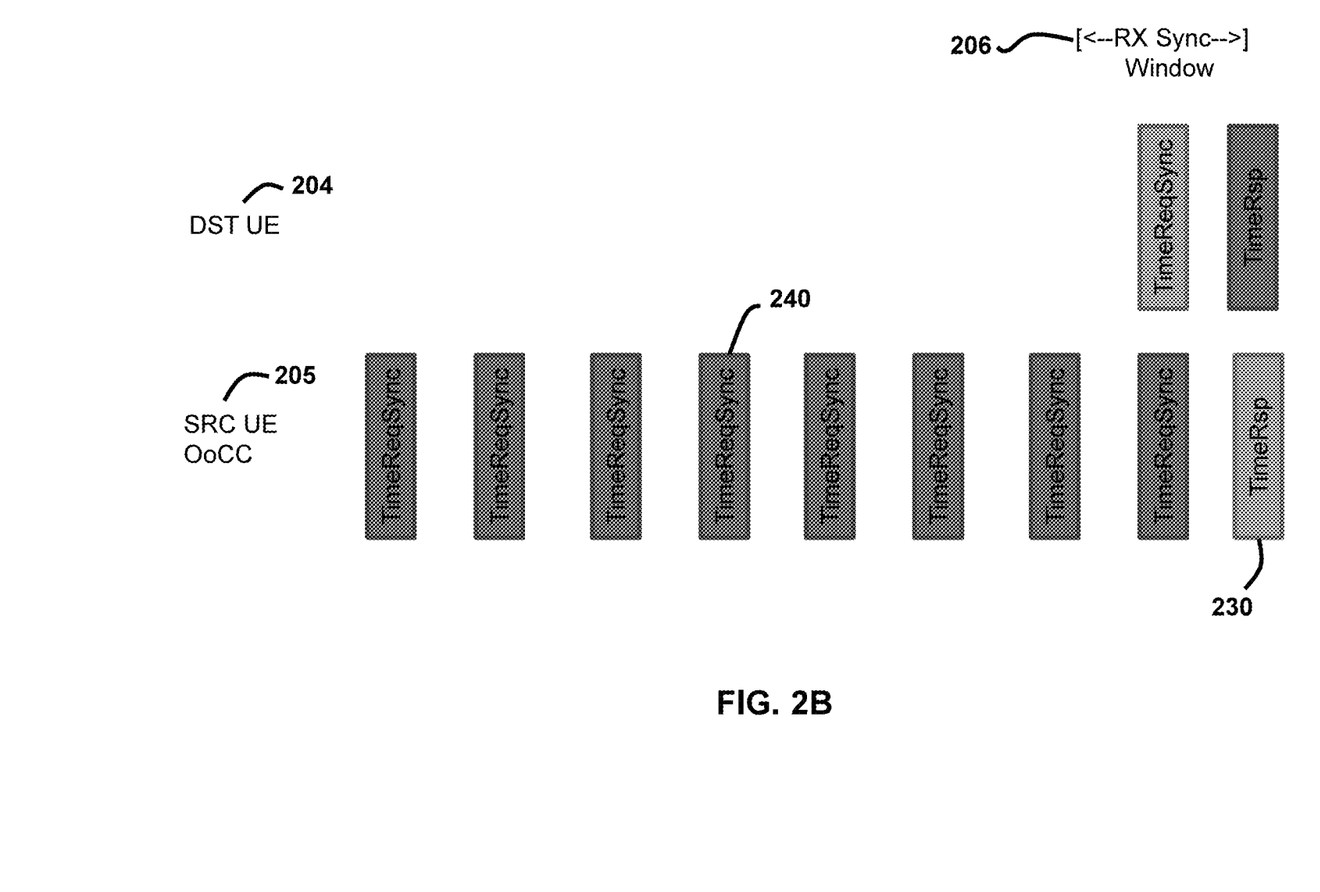
FIG. 2B illustrates a 2-step approach for a timing request solution supporting SL communication, in accordance with embodiments of the present disclosure.

According to some of the embodiments, D2D communications, for example, SL communications, can be supported by using a timing request solution. The timing request solution can resolve both the synchronization problem and the unknown SL-PO location problem which has been noted above. FIGS. 2A and 2B illustrate examples of the timing request solution supporting SL communication, in accordance with embodiments of the present disclosure. Specifically, FIG. 2A illustrates a 3-step approach and FIG. 2B illustrates a 2-step approach of the timing request solution supporting SL communication.

The timing request method can be appropriate for an unsynchronized UE which has no knowledge about the SL-PO (e.g. location of the SL-PO). As illustrated in FIG. 2A, the unsynchronized UE (e.g. SRC UE 202) blindly and repeatedly transmits a SL-Sync signal (e.g. SYNC 210) followed by a SL timing request message (e.g. SL-TimeReq 220) until it receives a timing response message (e.g. SL-TimingRsp 230) from a DST UE (e.g. DST UE 201). Since the out of cellular coverage (OoCC) SRC UE (e.g. SRC UE 202) has no timing information, the SRC UE needs to repeatedly transmit the SL-Sync signal (e.g. SYNC 210) and the SL timing request message (e.g. SL-TimeReq 220) until the SL-SYNC signal is received by a DST UE within the DST UE's Rx Sync window (e.g. Rx Sync Window 203). Upon receipt of the SL timing request message (e.g. SL-TimeReq 220), each DST UE that correctly receives the SL-Sync signal and SL timing request message transmits a timing response message (e.g. SL-TimeRsp 230) in response to the receipt of the SL-Sync signal and SL timing request message. The timing response message can include one or more of the following pieces of information:

Precise timing information: μsec timing correction to the nearest subframe (SF) and SF timing Macro timing information: system frame timing, similar to MIB, and hyper frame timing, similar to SIB1

Sync method information: e.g. GNSS, PSS/SSS/MIB, transmitter (Tx) beacon, etc.

UE ID: ID of the DST UE that may be used to calculate future SL-POs

SL-DRX information: SL-DRX may be used to calculate future SL-POs

Receiver (Rx) beacon information: Rx beacon ID and SL-DRX

While the timing request method as defined above may consume significant power, the method only needs to be done once at power-up and may not be required for re-synchronization. The more SL UEs that exist within range, the higher the probability that the SRC UE receives a timing response message (e.g. SL-TimeRsp 230) in response to its SL timing request.

In some embodiments, as illustrated in FIG. 2B, the unsynchronized UE (e.g. SRC UE 205) does not transmit the SL timing request message (e.g. SL-TimeReq 220) but transmits a special Sync signal (e.g. TimeReqSync 240) as the SL timing request message (e.g. SL-TimeReq 220 does not carry any required information). In some embodiments, the special Sync signal can be configured as a combination of the SL-Sync signal (e.g. SYNC 210) and the SL timing request message (e.g. SL-TimeReq 220). This can be envisioned as a 2-step approach for the timing request method illustrated in FIG. 2B. Upon detecting the special Sync signal (e.g. TimeReqSync 240) during the Rx Sync Window 206, the DST UE (e.g. DST UE 204) broadcasts the timing response message (e.g. SL-TimeRsp 230). The 2-step approach allows synchronization requests to be sent more frequently.

In some embodiments, the timing request method may be enhanced using optional receiver (Rx) beacons. Rx beacons can be considered to be UEs with larger battery capacity or direct power supply (e.g. AC powered) that are listening for the SL Sync signals more often. The UEs are listening for SL Sync signals more often by being configured with no SL-DRX, shorter SL-DRX cycles or long Rx Sync windows. These configurations can increase the probability that the SRC UE's timing request (e.g. SL-TimeReq 220) will be responded to. The out of cellular communication UE can learn about an Rx beacon in two ways. For example, information regarding the Rx beacon can be received directly from the SL server or via a mesh SL-UE. As another example, the information regarding the Rx beacon can be received through the SL timing response message (e.g. SL-TimeRsp 230).

In some embodiments, if there are no Rx beacons, the out of cellular communication UE can request the SL server to declare a UE as a Rx (or Tx) beacon. Advantages of Rx beacons or Tx beacons are known and the advantages can include for example, the feature that Rx beacons do not create traffic or interference, and that Rx beacons can be more efficient with power consumption as they only receive communications and do not transmit.

As stated above, UEs may need to be periodically re-synchronized, for example due to XTAL error. After the initial synchronization, the SRC UE knows at least one DST UE's SL-PO location and optionally, a Rx beacon's SL-PO location which can be used for the SRC UE's re-synchronization. As such, the timing request solution can be more energy efficient compared to other approaches such as GNSS and deep coverage PSS/SSS/MIB.

Pseudo Unique SL Sync Signals

If all the UEs use the same SL Sync signals, it may be common for a UE to mistakenly detect a SL Sync signal associated with another UE. This can be more common, especially in a congested network or a network that requires a longer Rx Sync window. It may be noted that a Rx Sync window will likely need to be much longer (e.g. many times longer) than the 1 SF designated for SL-PO. Misdetection of the SL Sync signal can cause a waste of power as the UE would decode the SL-Data that is not intended for it. Moreover, the UE may miss the SL Sync signal intended for it, if the correct SL Sync signal is transmitted or broadcasted while the UE is decoding the SL-Data intended for another UE.

According to some of the embodiments, D2D communication, for example SL communications, can be supported wherein different SL Sync signals are assigned to different DST UEs (e.g. assigning a unique or pseudo-unique SL Sync signal to each DST UE) in order to mitigate the above defined problem. In some embodiments, SL Sync signals are not uniquely assigned to all UEs as it may not be practical, depending on the SL Sync signal design, to assign unique SL Sync signals to all UEs. However, assigning a pseudo-unique SL Sync signal can be acceptable (i.e. some overlap is acceptable) as the probability of decoding a SL Sync intended for another UE will be significantly decreased with pseudo-unique SL Sync signal assignment. Moreover, the probability of decoding a SL Sync intended for another UE can be further reduced by ensuring that a unique SL-PO is assigned to the UE such that SL-PO is unique with respect to the close SL-POs, as the risk of misdetection (or collision) is higher between close SL-POs. Since there are a finite number of SL-POs, each SL-PO associated with the UE can be given a unique SL Sync signal, especially with respect to SL-POs that are closely located. Given that the location of the SL-PO is already known, the SRC UE can know which SL Sync to transmit.

SL Server Provides Coarse Time Sync Error

As stated above, the SL Rx Sync window should be minimized in order to minimize power consumption of the UE. According to some of the embodiments, in order to reduce the SL Rx Sync window, some of synchronization errors present may be provided to the DST UE by the SL server to aid with the mitigation of these synchronization errors. The synchronization errors provided by the SL server can help the DST UE to reduce the SL Rx Sync window. According to some of the embodiments, SL communications can be supported wherein given that the SL Rx Sync window is equal to or greater than the sum of Coarse Sync Timing Error, DST UE Sync Error, SRC UE Sync Error, and Time of Flight, the DST UE can know or manage each of the associated synchronization errors as follows:

Coarse Sync Timing Error depends on the synchronization method. As the maximum error should be static, the Coarse Sync Timing error can be provided to the DST UE, for example in some instances by the SL server. If the system uses a different sync method, the errors associated with the respective sync method can be provided to the DST UE.

SRC UE Sync Error. Given the large number of potential SRC UEs, acquiring the SRC UE specific value (e.g. SRC UE specific Sync error) may not be practical. As such, a system-wide wide Maximum SRC UE Sync error can be defined in the system specifications or defined within the SL server. The SRC UE can be re-synchronized close enough to when it transmits the Sync signal in order to ensure the synchronization error of that SRC UE is equal to or less than the defined system-wide Maximum SRC UE Sync Error.

DST UE Sync Error. As illustrated above with respect to the SRC UE Sync Error, the DST UE Sync Error can be managed by the DST UE directly by ensuring that one or both of: 1) the SL Rx Sync window is long enough; and 2) the DST UE re-synchronizes often enough to ensure the DST UE Sync Error does not make the total synchronization error exceed the SL Rx Sync Window (e.g. the DST UE's contribution to the total synchronization error is kept within the SL Rx Sync Window).

Time of Flight: Mitigation of an error associated with the time of flight can be achieved by defining a system-wide Maximum Time of Flight by the SL server or specified with respect to the particular system.

Multiple SL Attempts

According to some of the embodiments, D2D communications, for example SL communications, can be supported wherein the SL Rx Sync window can be reduced by performing multiple SL attempts. Further, multiple SL attempts may also allow re-synchronization of the UE to be performed less frequently. As noted above, if the required SL Rx Sync window duration is long or re-synchronization of the UEs needs to be performed frequently, power consumption associated with the UE can be expected to be high. For instance, for XTAL of 10 ppm (e.g. oscillator frequency stability of 10 ppm), 10 µsec of time error would be accumulated in every second. If the maximum DST UE Sync error needs to be equal to or less than 20 msec, re-synchronization can be required to be performed every 33.4 minutes (10e−6*33.4*60=0.020 sec). Re-synchronization using PSS/SSS/MIB at low SNR or GNSS can take up to 10 seconds.

Figure 3A:
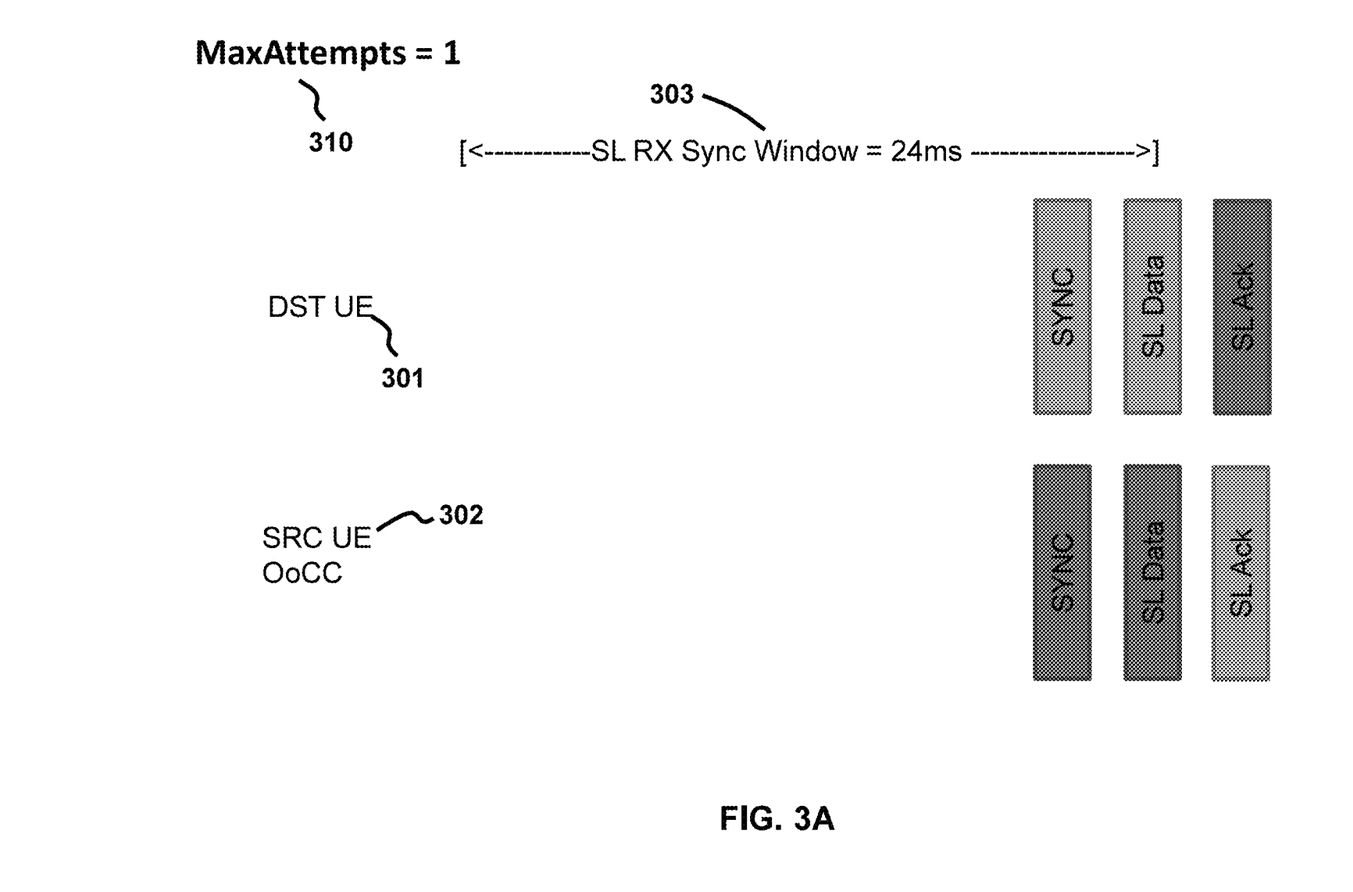
FIG. 3A illustrates an example of a required Rx SYNC window for the DST UE based on a single SL SYNC attempt by the SRC UE, in accordance with embodiments of the present disclosure.
Figure 3B:
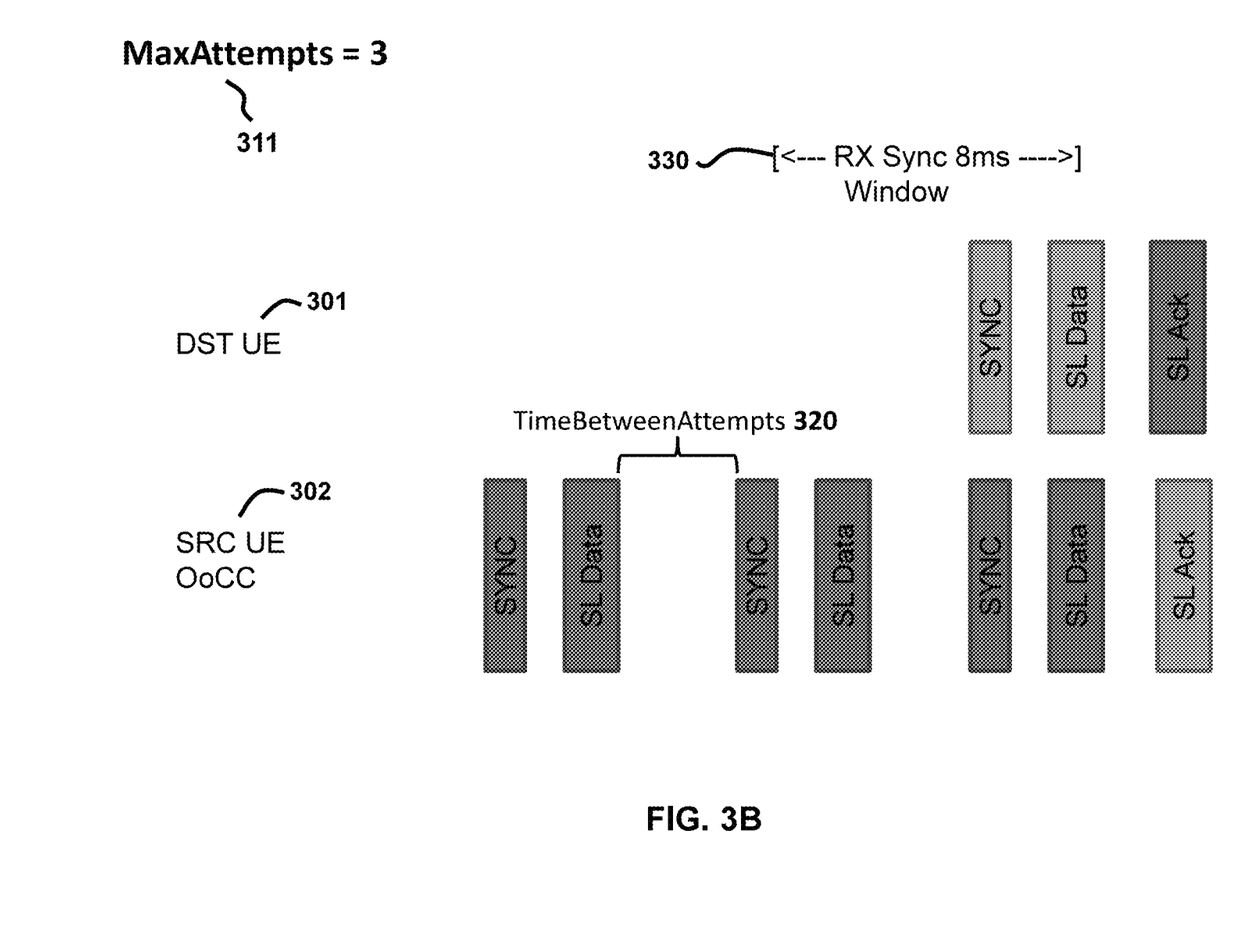
FIG. 3B illustrates an example of a required Rx SYNC window for the DST UE based on three SL SYNC attempts by the SRC UE, in accordance with embodiments of the present disclosure.

According to some of the embodiments, the multiple SL attempts solution requires the SRC UE to send multiple SL Sync signals and SL data attempts in quick succession. In various embodiments, the maximum number of attempts (e.g. MaxAttempts 310) and the time between the attempts (e.g. TimeBetweenAttempts 320) are provided to the SRC UE by the SL server for a particular DST UE.

FIGS. 3A and 3B illustrates a reduction of the required Rx Sync window for the DST UE by increasing the number of SL attempts by the SRC UE, in accordance with embodiments of the present disclosure. Specifically, FIG. 3A illustrates the Rx Sync window for a single sync attempt and FIG. 3B illustrates the Rx Sync window for 3 sync attempts. As illustrated by comparing FIG. 3A and FIG. 3B, the required Rx Sync window for the DST UE can be reduced from 24 ms to 8 ms by increasing the number of attempts sent by the SRC UE from 1 to 3.

As illustrated in FIG. 3A, the SRC UE 302 transmits a single Sync signal and a single SL Data signal and in order to ensure that the DST UE 301 receive these signals the SL Rx Sync window has a particular duration, for example 24 ms. As illustrated in FIG. 3B, by increasing the number of sync attempts, the Rx Sync window 330 can be smaller than the Rx Sync window 303 illustrated in FIG. 3A.

According to some of the embodiments, the time between the attempts (e.g. TimeBetweenAttempts 320) is equal to the DST SL Rx Sync window 330. The DST SL Rx SYNC window 330 must be at least long enough to send the SL SYNC signal (1 ms), detect the SL Sync signal (1 ms), send SL data (1 ms), decode the SL Data (3 ms), send an SL Acknowledgement (1 ms) and decode the SL Acknowledgement (1 ms). The values defined in parentheses for each of the above noted activities performed by the respective UE are practical times required for each respective activity. As the sum of the practical time required for each activity is 8 ms, the length of the DST SL Rx Sync window 330 must be at least 8 ms to allow for all of the above noted activities to be completed during the Rx Sync window. As such, for this example, the time between the attempts (e.g. TimeBetweenAttempts 320) equals to 8 ms.

According to some of the embodiments, the power required for the SRC UE when transmitting n sync attempts instead of 1 sync attempt is less than the power required when using a longer Rx Sync window at the DST UE, due to the less frequent SL Data transmissions.

Parallel SYNC/SL Decode or SL-PO Before SYNC

Figure 4A:
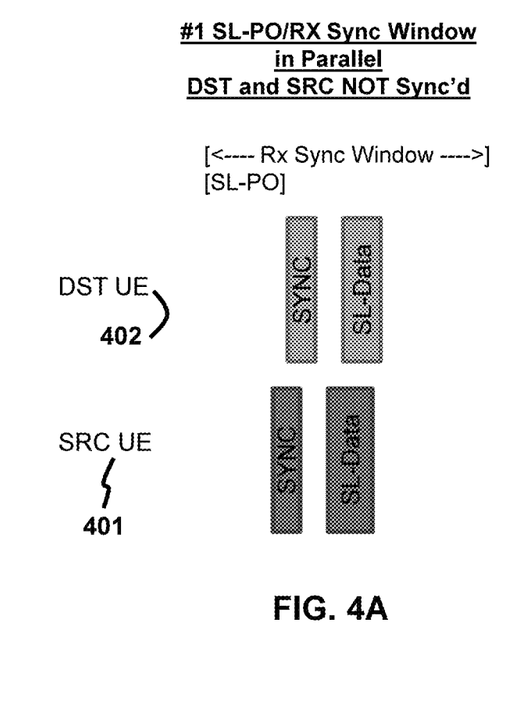
FIGS. 4A to 4C illustrate examples of placing a SL-PO in parallel to the Rx SYNC window and placing the SL-PO before the Rx SYNC window, in accordance with embodiments of the present disclosure.
Figure 4B:
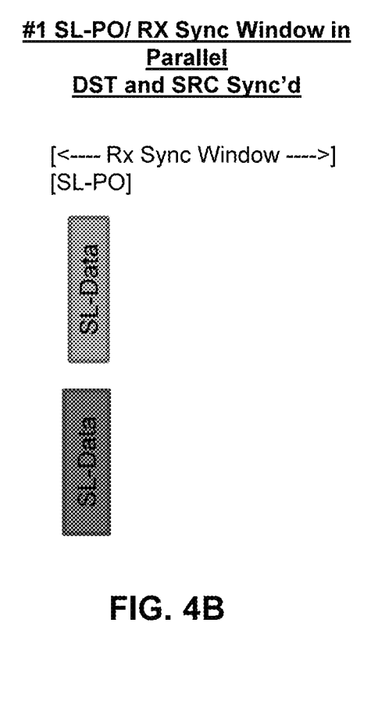
Figure 4C:
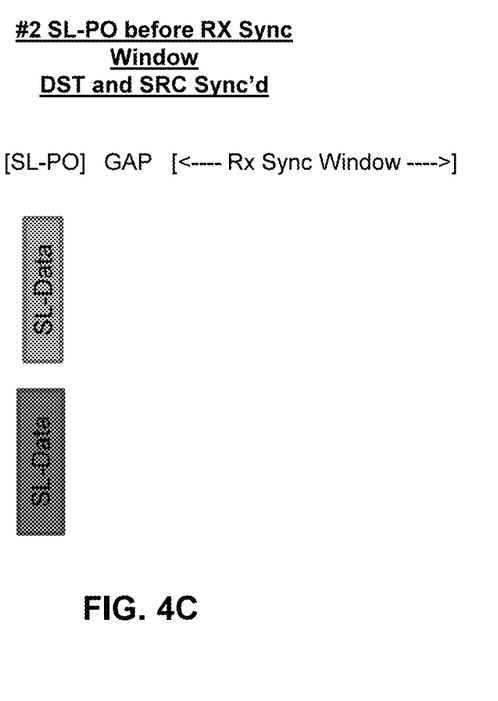

Currently existing SL protocols require always transmitting the Sync signal before transmitting the SL-Data. However, such a requirement increases latency. According to some of the embodiments, this latency issue can be resolved by placing SL-PO decoding in parallel to the Rx Sync window time or by placing SL-PO before the Rx Sync window. FIGS. 4A to 4C illustrate examples of placing a SL-PO in parallel to the Rx SYNC window and placing the SL-PO before the Rx SYNC window, in accordance with embodiments of the present disclosure. FIG. 4A illustrates transmissions of the DST UE 402 and the SRC UE 401 when the SL-PO and Rx Sync window are in parallel and the DST UE and the SRC UE are not synchronized. FIG. 4B illustrates transmissions of the DST UE 402 and the SRC UE 401 when the SL-PO and Rx Sync window are in parallel and the DST UE and the SRC UE are synchronized. FIG. 4C illustrates transmissions of the DST UE 402 and the SRC UE 401 when the SL-PO is located before the Rx Sync window and the DST UE and the SRC UE are synchronized.

According to some of the embodiments, D2D communications, for example SL communications, can be supported wherein the SRC UEs may be provided with an option to not send a SYNC signal before the SL-Data when the SRC UE knows it is synchronized with the DST UE. This configuration can reduce latency and reduce power consumption by the UE. This method can be used for example when both the SRC UE and DST UE are using PSS/SSS/MIB synchronization method associated with the same base station.

According to some of the embodiments, the SRC UE can choose to skip sending a Sync signal and transmit SL-Data only. In such embodiments, only if the SL-Data transmission fails (i.e. only if the SRC UE does not receive an acknowledgement message from the DST UE), the SRC UE transmits a Sync signal followed by SL-Data at the next available Rx Sync window. If an acknowledgement message is expected before the end of the Rx Sync window, the SRC UE does not even need to wait for the next SL-DRX cycle.

According to some of the embodiments, skipping transmission of the Sync signal can be beneficial when the SRC UE prioritizes extending its battery life over SL latency. Skipping transmission of the Sync signal can also be beneficial when the SRC UE has some form of a-priori knowledge that the DST UE is likely to be synchronized with it (e.g. when the two UEs are in the same cell). The SL server can optionally hold the information whether the SRC UE and DST UE are synchronized (e.g. PSS/SSS/MIB and corresponding cell ID).

Figure 5:
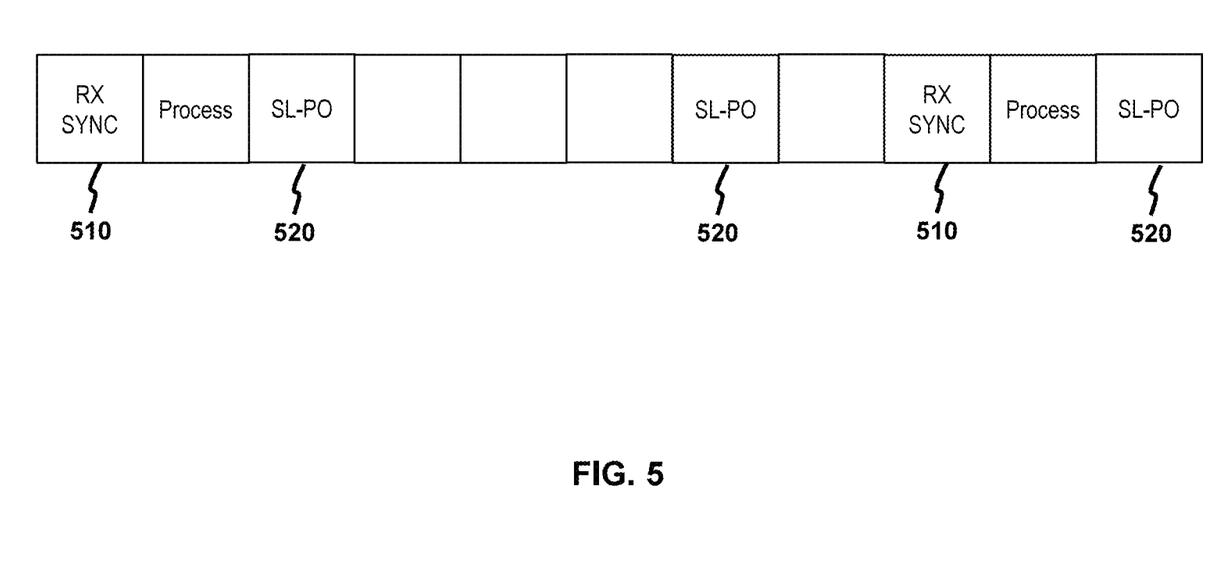
FIG. 5 illustrates an example scenario wherein the Rx SYNC window occurs every second SL-PO, in accordance with embodiments of the present disclosure.

Having a Rx Sync window for every SL-PO can draw a considerable amount of power from the DST UE, in particular when most UEs are synchronized. According to some of the embodiments, not every SL-PO needs to have an associated Rx Sync window. FIG. 5 illustrates a non-limiting example scenario where the Rx Sync window occurs for every second SL-PO, in accordance with embodiments of the present disclosure. Referring to FIG. 5, the period of the SL-PO 520 is half that of Rx Sync window 510.

According to some of the embodiments, as the SRC UE needs to know locations of the Rx Sync window, the SL server can provide the SRC UE with information regarding the Rx Sync window location.

Timing Via SL Sync

According to some of the embodiments, D2D communications, for example SL communications, can be supported, wherein a UE is willing to use extra power in order to determine the timing of the transmission of the SL-Data signal (e.g. less than 1 SF timing) by decoding the SL Sync signals from any UE. This decoding of the Sync signal can provide timing accuracy equal to or less than the sum of the SRC UE Sync Error and the Coarse Sync Timing Error. If the sum of the SRC UE Sync Error and the Coarse Sync Timing is greater than 1 ms, timing of the SL-Data transmission may not be inferred unless the SL Sync signal is restricted to be transmitted on a certain SF (e.g. the 5th SF of every frame). In a case where the SL Sync signal is restricted to be transmitted on certain SF, the SL-Data transmission timing can be determined to be within a 10 ms radio frame.

Upon determination of the timing of the SL-Data transmission, the SRC UE can directly transmit the SL-Data on the SL-PO of the DST UE without transmitting an SL Sync signal. This method can be used if the SL Sync signal comes from a UE that is in cell coverage or an out of cellular coverage UE that in turn receives the SL Sync signal from a UE that is within cell coverage. An indication of this qualification of the above can be required in order to validate the SL Sync signal.

Figure 6:
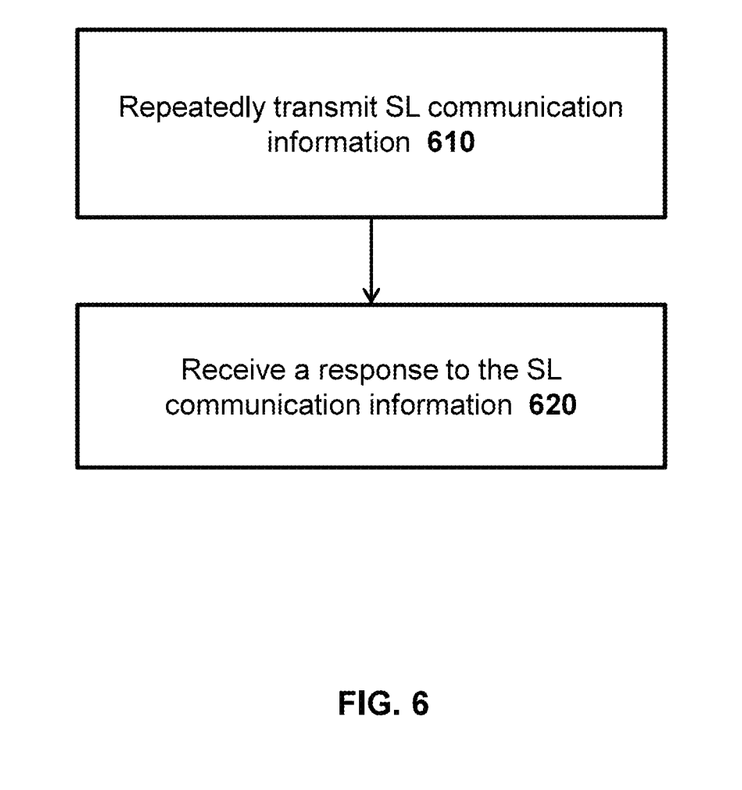
FIG. 6 illustrates a method for supporting side link communication, in accordance with embodiments of the present disclosure.

According to some of the embodiments, there is provided a method and apparatus for unsynchronized user equipment (UE) to perform device to device communication, for example side link communication. With reference to FIG. 6, the method includes repeatedly transmitting, by a source user equipment (SRC UE), SL communication information 610 and receiving, by the SRC UE from the DST UE, a response to the SL communication information 620. The SRC UE continues repeated transmission of SL communication information until the response is received.

According to some of the embodiments, the SL communication information comprises an SL sync signal and an SL timing request message, the SL sync signal being transmitted prior to the SL timing request. According to some of the embodiments, the SL communication information is a single synchronization signal, the single synchronization signal configured at least in part as a SL sync signal and a SL timing request message.

Figure 7:
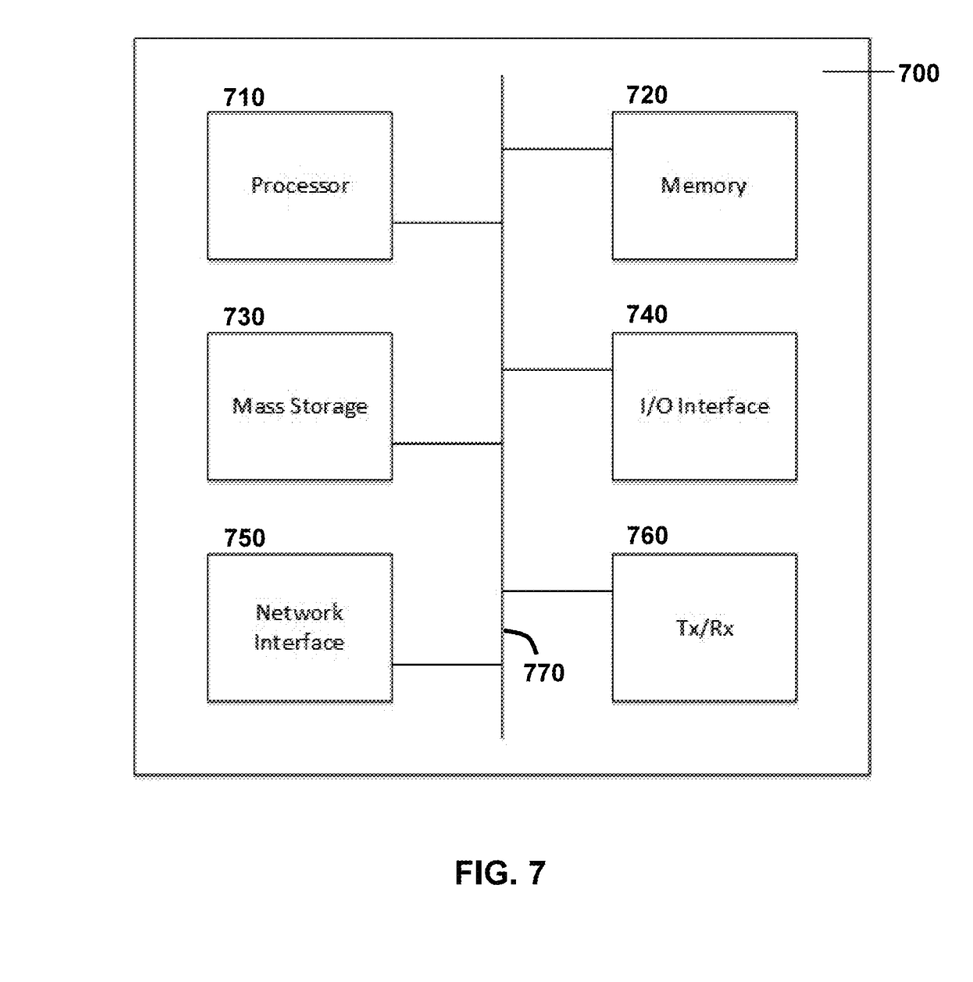
FIG. 7 is a schematic diagram of an electronic device according to embodiments of the present disclosure.

FIG. 7 is a schematic diagram of an electronic device 700 that may perform any or all of the steps of the above methods and features described herein, according to different embodiments of the present invention. For example, a UE may be configured as the electronic device.

As shown, the device includes a processor 710, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus.

The memory 720 may include any type of non-transitory memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon statements and instructions executable by the processor 710 for performing any of the aforementioned method steps described above.

As will be readily understood by the description above, the terms base station and network node can be interchangeably used to define an evolved NodeB (eNB), a next generation NodeB (gNB) or other base station or network node configuration.

As previously discussed, it will be readily understood that communication between wireless devices can be enabled in multiple ways, and it can be defined as device to device (D2D) communications. In some embodiments of the present disclosure D2D communication has been defined as side link (SL) communications as an example. However, it will be readily understood by a worker skilled in the art how to apply any embodiments which may be defined as SL communications to a more general version of D2D communications.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for supporting device to device communication (D2D), the method comprising:
repeatedly transmitting, by a source user equipment (SRC UE), side link (SL) communication information; and
receiving, by the SRC UE from a destination UE (DST UE), a response to the SL communication information;

wherein transmission of the SL communication information is repeated until the response is received; and
wherein the response includes one or more of: precise timing, macro timing, a synchronization method, an identifier (ID) of the DST UE, SL-discontinuous reception (SL-DRX) information and receiver (Rx) beacon information.

2. A method for supporting device to device communication (D2D), the method comprising:
repeatedly transmitting, by a source user equipment (SRC UE), side link (SL) communication information; and
receiving, by the SRC UE from a destination UE (DST UE), a response to the SL communication information;
wherein transmission of the SL communication information is repeated until the response is received; and
wherein a SL-PO occurs prior to or within a time window that the DST UE monitors for the SL communication information.

3. The method of claim 2, wherein the SL communication information includes one or more of a SL sync signal and SL data.

4. The method of claim 3, wherein the SL-data is a SL timing request message or a SL sync request message.

5. The method of claim 3, wherein the SL-data is configured using one or more of orthogonal frequency division multiplexing and quadrature phase shift keying.

6. The method of claim 2, wherein when the SRC UE is synchronized with the DST UE, the SL communication information includes SL-data and excludes a SL sync signal or wherein when the SRC UE is unsynchronized with the DST UE, the SL communication information includes the SL sync signal and the SL-data, the SL sync signal transmitted prior to the SL-data.

7. The method of claim 2, wherein the SL communication information is a single synchronization signal, the single synchronization signal configured at least in part as a SL sync signal and a SL timing request.

8. The method of claim 2, wherein the SRC UE determines timing of transmission of the SL communication information based on whether the SRC UE is synchronized with the DST UE or whether the SRC UE is unsynchronized with the DST UE.

9. The method of claim 2, wherein the DST UE is configured to monitor for the SL communication information within a time window.

10. The method of claim 2, wherein transmission of the SL communication information is repeated multiple times based on a maximum number of attempts to transmit and a time between the attempts.

11. The method of claim 2, wherein transmission of the SL communication information is performed in cooperation with a receiver (Rx) beacon.

12. The method of claim 2, wherein a server provides the DST UE with one or more synchronization errors including: Coarse Sync Timing Error, DST UE Sync Error, SRC UE Sync Error, and Time of Flight.

13. The method of claim 2, wherein a Coarse Sync Timing Error is determined based on a synchronization method.

14. The method of claim 2, wherein the SL communication information comprises a unique SL sync signal or a pseudo-unique SL sync signal.

15. A user equipment (UE) comprising:
a processor; and
machine readable memory storing machine executable instructions which when executed by the processor configure the UE to:
repeatedly transmit side link (SL) communication information; and
receive, from a destination UE (DST UE), a response to the SL communication information;
wherein transmission of the SL communication information is repeated until the response is received; and
wherein the response includes one or more of: precise timing, macro timing, a synchronization method, an identifier (ID) of the DST UE, SL-discontinuous reception (SL-DRX) information and receiver (Rx) beacon information.

16. A user equipment (UE) comprising:
a processor; and
machine readable memory storing machine executable instructions which when executed by the processor configure the UE to:
repeatedly transmit side link (SL) communication information; and
receive, from a destination UE (DST UE), a response to the SL communication information;
wherein transmission of the SL communication information is repeated until the response is received; and
wherein a SL-PO occurs prior to or within a time window that the DST UE monitors for the SL communication information.

17. The UE of claim 16, wherein the SL communication information includes one or more of a SL sync signal and SL data.

18. The UE of claim 17, wherein the SL-data is a SL timing request message or a SL sync request message.

19. The UE of claim 17, wherein the SL-data is configured using one or more of orthogonal frequency division multiplexing and quadrature phase shift keying.

20. The UE of claim 16, wherein when the SRC UE is synchronized with the DST UE, the SL communication information includes SL-data and excludes a SL sync signal or wherein when the SRC UE is unsynchronized with the DST UE, the SL communication information includes the SL sync signal and the SL-data, the SL sync signal transmitted prior to the SL-data.

21. The UE of claim 16, wherein the SL communication information is a single synchronization signal, the single synchronization signal configured at least in part as a SL sync signal and a SL timing request.

22. The UE of claim 16, wherein the SRC UE determines timing of transmission of the SL communication information based on whether the SRC UE is synchronized with the DST UE or whether the SRC UE is unsynchronized with the DST UE.

23. The UE of claim 16, wherein the DST UE is configured to monitor for the SL communication information within a time window.

24. The UE of claim 16, wherein transmission of the SL communication information is repeated multiple times based on a maximum number of attempts to transmit and a time between the attempts.

25. The UE of claim 16, wherein transmission of the SL communication information is performed in cooperation with a receiver (Rx) beacon.

26. The UE of claim 16, wherein a server provides the DST UE with one or more synchronization errors including: Coarse Sync Timing Error, DST UE Sync Error, SRC UE Sync Error, and Time of Flight.

27. The UE of claim 16, wherein a Coarse Sync Timing Error is determined based on a synchronization method.

28. The UE of claim 16, wherein the SL communication information comprises a unique SL sync signal or a pseudo-unique SL sync signal.

* * * * *